United States Patent
Bier et al.

Patent Number: 5,849,414
Date of Patent: Dec. 15, 1998

[54] PRODUCTION OF SCRATCH-RESISTANT POLYCARBONATE MOULDED PARTS

[75] Inventors: Peter Bier; Dieter Freitag, both of Krefeld; Gerhard Schottner, Heilsbronn, all of Germany

[73] Assignee: Bayer AG, Germany

[21] Appl. No.: 793,669

[22] PCT Filed: Aug. 21, 1995

[86] PCT No.: PCT/EP95/03316

§ 371 Date: Feb. 27, 1997

§ 102(e) Date: Feb. 27, 1997

[87] PCT Pub. No.: WO96/07692

PCT Pub. Date: Mar. 14, 1996

[30] Foreign Application Priority Data

Sep. 2, 1994 [DE] Germany .................. 44 31 216.4

[51] Int. Cl.$^6$ .................................................. B32B 27/36
[52] U.S. Cl. ................................................... 428/412
[58] Field of Search ........................................ 428/412

[56] References Cited

U.S. PATENT DOCUMENTS

| | | | |
|---|---|---|---|
| 4,746,366 | 5/1988 | Phillip et al. | 428/412 |
| 5,126,428 | 6/1992 | Freitag et al. | 528/196 |
| 5,298,477 | 3/1994 | Wehrmann et al. | 428/412 |
| 5,316,855 | 5/1994 | Wang et al. | 428/412 |
| 5,401,579 | 3/1995 | Basil et al. | 428/412 |

*Primary Examiner*—Veronica P. Hoke
*Attorney, Agent, or Firm*—Connolly & Hutz

[57] ABSTRACT

Method for coating the surface of polycarbonate moulded parts, with a polycarbonate based on a diphenol of formula (Ia)

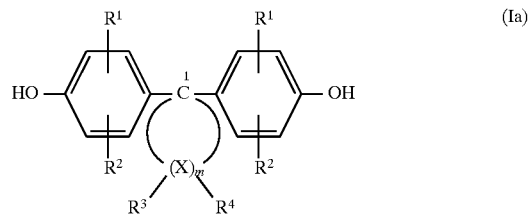

wherein $R^1$, $R^2$, $R^3$, X and m are defined herein, and a material (b), which has been obtained by hydrolytic polycondensation of an aluminum compound of an organofunctional silane and an oxide component.

12 Claims, No Drawings

PRODUCTION OF SCRATCH-RESISTANT POLYCARBONATE MOULDED PARTS

BACKGROUND OF THE INVENTION

Moulded parts made from polycarbonates are distinguished by transparency, high impact strength, high heat deflection temperature and dimensional stability. However their susceptibility to scratching often detracts from these qualities. In order to remedy this, the moulded parts can be provided beforehand with a scratch-resistant layer. The scratch-resistant coatings or coating methods used hitherto are still not completely satisfactory particularly as regards scratch resistance and adhesion of the layer to the substrate with the lowest possible layer thickness or curing time of the scratch-resistant layers.

The invention relates to a method for coating particular polycarbonates having a high heat deflection temperature using particular siloxane-containing coatings, wherein the resulting coating has a particularly high scratch resistance and good adhesion to the substrate and the coating cures within a short period and exhibits a particular transparency.

SUMMARY OF THE INVENTION

The invention provides a method for coating polycarbonate moulded parts, which is characterised in that to the surface of a moulded body composed of a polycarbonate based on a diphenol of formula (Ia)

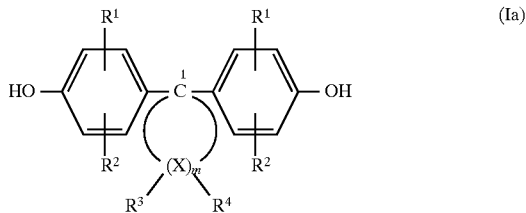

wherein
$R^1$ and $R^2$ independently of one another signify hydrogen, halogen, preferably chlorine or bromine, $C_1$–$C_8$ alkyl, $C_5$–$C_6$ cycloalkyl, $C_6$–$C_{10}$ aryl, preferably phenyl, and $C_7$–$C_{12}$ aralkyl, preferably phenyl-$C_1$–$C_4$ alkyl, in particular benzyl,
m signifies 4 or 5,
$R^3$ and $R^4$ are individually selectable for each X and independently of one another signify hydrogen or $C_1$–$C_6$ alkyl and
X signifies carbon,
with the proviso that, on at least one atom X, $R^3$ and $R^4$ simultaneously signify alkyl,
a material (b), which has been obtained by hydrolytic polycondensation of an aluminium compound of an organofunctional silane and an oxide component, is applied in a thickness of from 2 to 200 μm and the material is cured at a temperature of from 135° to 180° C.

The invention also provides the scratch-resistant polycarbonate moulded bodies thus obtained.

The polycarbonates A are high-molecular, thermoplastic, aromatic polycarbonates having molecular weights $\overline{M}_w$ (weight average) of at least 10,000, preferably of from 20,000 to 300,000, which contain the bifunctional carbonate structural units of formula (I)

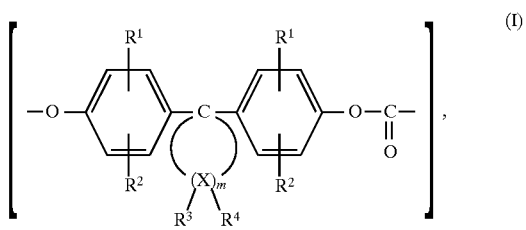

wherein
$R^1$ and $R^2$ independently of one another signify hydrogen, halogen, preferably chlorine or bromine, $C_1$–$C_8$ alkyl, $C_5$–$C_6$ cycloalkyl, $C_6$–$C_{10}$ aryl, preferably phenyl, and $C_7$–$C_{12}$ aralkyl, preferably phenyl-$C_1$–$C_4$ alkyl, in particular benzyl,
m signifies 4 or 5,
$R^3$ and $R^4$ are individually selectable for each X and independently of one another signify hydrogen or $C_1$–$C_6$ alkyl and
X signifies carbon,
with the proviso that, on at least one atom X, $R^3$ and $R^4$ simultaneously signify alkyl.

PREFERRED EMBODIMENTS

These polycarbonates and the underlying dihydroxydiphenylcycloalkanes of formula (Ia) and the preparation of both products are described in detail in EP 395 953. The dihydroxydiphenylcycloalkanes of formula (Ia) are starting materials for the polycarbonates A. In this formula (Ia) the preferred alkyl radical is methyl; the X atoms in the α-position to the diphenyl-substituted C atom (C1) are preferably not dialkyl-substituted, whereas alkyl disubstitution in the β-position to C1 is preferred.

Dihydroxydiphenylcycloalkanes having rings of 5 and 6 C atoms in the cycloaliphatic radical (m=4 or 5 in formula Ia) are preferred, for example the diphenols of formulae (Ib) to (Id)

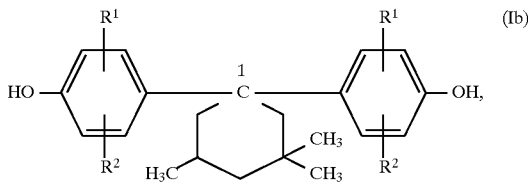

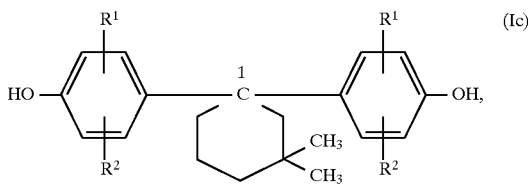

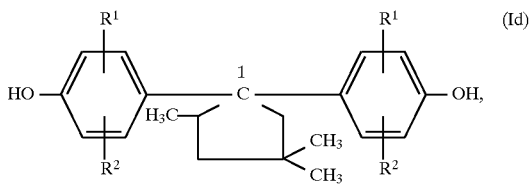

with the 1,1-bis(4-hydroxyphenyl)-3,3,5-trimethylcyclohexane (formula Ib having $R^1$ and $R^2$ equal to H) being particularly preferred.

One diphenol of formula (Ia) may be used, with the formation of homopolycarbonates, or several diphenols of formula (Ia) may be used, with the formation of copolycarbonates.

Furthermore the diphenols of formula (Ia) may also be used mixed with other diphenols, for example with those of formula (Ie)

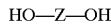  (Ie)

for the preparation of high-molecular, thermoplastic, aromatic polycarbonates.

Other suitable diphenols of formula (Ie) are those wherein Z is an aromatic radical having 6 to 30 C atoms, which can contain one or more aromatic rings, can be substituted and can contain as bridges aliphatic radicals or cycloaliphatic radicals different from those in formula (Ia) or hetero atoms.

Particularly preferred diphenols of formula (Ie) are, for example:
2,2-bis(4-hydroxyphenyl)propane, 2,2-bis(3,5-dimethyl-4-hydroxyphenyl)propane, 2,2-bis(3,5-dichloro-4-hydroxyphenyl)propane, 2,2-bis(3,5-dibromo-4-hydroxyphenyl)propane and 1,1-bis(4-hydroxyphenyl)-cyclohexane. They can be used both individually and as mixtures.

The molar ratio of diphenols of formula (Ia) to the other diphenols of formula (Ie) optionally used concomitantly is to be between 100 mol-% of (Ia) to 0 mol-% of (Ie) and 2 mol-% of (Ia) to 98 mol-% of (Ie), preferably between 100 mol-% of (Ia) to 0 mol-% of (Ie) and 5 mol-% of (Ia) to 95 mol-% of (Ie), particularly between 100 mol-% of (Ia) to 0 mol-% of (Ie) and 10 mol-% of (Ia) to 90 mol-% of (Ie), and most particularly between 100 mol-% of (Ia) to 0 mol-% of (Ie) and 20 mol-% of (Ia) to 80 mol-% of (Ie).

The high-molecular polycarbonates made from the diphenols of formula (Ia), optionally in combination with other diphenols, can be prepared by all the known methods for the preparation of polycarbonates. Here the different diphenols can be linked to one another both statistically and in blocks.

The polycarbonates can be branched in a manner known per se by condensing small quantities, preferably quantities of between 0.05 and 2.0 mol-% (referred to diphenols used), of trifunctional or more than trifunctional compounds, particularly those having three or more than three phenolic hydroxyl groups. Examples of some branching agents having three or more than three phenolic hydroxyl groups are: phloroglucinol, 4,6-dimethyl-2,4,6-tri(4-hydroxyphenyl)-heptene-2, 4,6-dimethyl-2,4,6-tri(4-hydroxyphenyl) heptane, 1,3,5-tri(4-hydroxyphenyl)benzene, 1,1,1-tri(4-hydroxyphenyl)ethane, tri(4-hydroxyphenyl) phenylmethane, 2,2-bis[4,4-bis(4-hydroxyphenyl) cyclohexyl]propane, 2,4-bis(4-hydroxyphenylisopropyl) phenol, 2,6-bis(2-hydroxy-5-methylbenzyl)-4-methylphenol, 2-(4-hydroxyphenyl)-2-(2,4-dihydroxyphenyl)propane, hexa[4-(4-hydroxyphenylisopropyl)phenyl]orthoterephthalate, tetra (4-hydroxyphenyl)methane, tetra[4-(4-hydroxyphenylisopropyl)phenoxy]methane and 1,4-bis [4,4"-dihydroxytriphenyl)methyl]benzene.

Some other trifunctional compounds are 2,4-dihydroxybenzoic acid, trimesic acid, cyanuric chloride and 3,3-bis(3-methyl-4-hydroxyphenyl)-2-oxo-2,3-dihydroindole.

Monofunctional compounds are used in conventional concentrations as chain stoppers for the known per se control of the molecular weight of the polycarbonates A. Suitable compounds are, for example, phenol, tert. -butylphenols or other alkyl-$C_1$–$C_7$-substituted phenols. Small quantities of phenols of formula (If)

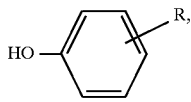  (If)

wherein
R represents a branched $C_8$ alkyl and/or $C_9$ alkyl radical are particularly suitable for controlling the molecular weight.

In the alkyl radical R the proportion of $CH_3$ protons is preferably between 47 and 89% and the proportion of CH— and $CH_2$ protons is preferably between 53 and 11%; also R is preferably in the o-position and/or p-position to the OH group, and particularly preferably the upper limit of the ortho-proportion is 20%. The chain stoppers are employed generally in quantities of from 0.5 to 10 mol-%, preferably from 1.5 to 8 mol%, referred to the diphenols used.

For further details reference is made to EP 395 953.

The polycarbonates A can be prepared by the known method in homogeneous phase, by the so-called "pyridine method" as well as by the known melt transesterification method using, for example, diphenyl carbonate instead of phosgene.

The polycarbonates have a high heat deflection temperature owing to the incorporation of diphenols of formula (Ia).

The particularly preferred polycarbonates A are those containing units of the formula (Ig)

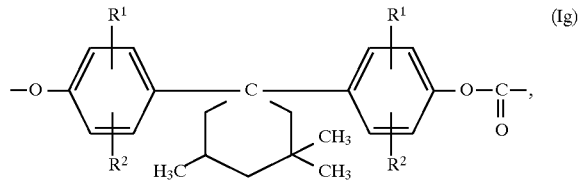  (Ig)

wherein $R^1$ and $R^2$ have the meanings given for formula (I), but which are particularly preferably hydrogen.

In addition to a high heat deflection temperature, the polycarbonates have a good UV-stability and good flow properties in the melt.

Through the optional combination with other diphenols, particularly with those of formula (Ie), the properties of the polycarbonates may moreover be varied advantageously. In copolycarbonates of this kind, the diphenols of formula (Ia) are contained in the polycarbonates in quantities of from 100 mol-% to 2 mol-%, preferably in quantities of from 100 mol-% to 5 mol%, particularly in quantities of from 100 mol-% to 10 mol-% and most particularly from 100 mol-% to 20 mol-%, referred to the total quantity of 100 mol-% of diphenol units.

The scratch-resistant coatings B are obtained by hydrolytic precondensation, optionally in the presence of a condensation catalyst composed of
a) at least one organofunctional silane of formula (I)

  (I)

wherein the groups X, which can be identical or different, signify hydrogen, halogen, alkoxy, acyloxy, alkylcarbonyl, alkoxycarbonyl or $NR''_2$ (R" represents H and/or alkyl) and the radicals R', which can be identical or different, represent alkyl, alkenyl, alkinyl, aryl, arylalkyl, alkylaryl, arylalkenyl, alkenylaryl, arylalkinyl or alkinylaryl, wherein these radicals can be interrupted by O atoms or S atoms or the group —NR" and can carry one or more substituents comprising the halogen group and the optionally substituted amino, amide, aldehyde, keto, alkylcarbonyl, carboxy, mercapto, cyano, hydroxy, alkoxy, alkoxycarbonyl, sulphate, phosphate, acryloxy, methacryloxy, epoxy or vinyl groups, and m has the value 1, 2 or 3, and/or an oligomer derived from these, in a quantity of from 25 to 95 mol-%, referred to the total number of moles of the (monomeric) starting components;
b) at least one aluminium compound of the empirical formula (II)

$$AlR_3 \quad \quad (II)$$

wherein the radicals R, which can be identical or different, signify halogen, alkyl, alkoxy, acyloxy or hydroxy, while the groups just mentioned can be wholly or partly replaced by chelating ligands, and/or an oligomer derived therefrom and/or an optionally complexed aluminium salt of an inorganic or organic acid, in a quantity of from 5 to 75 mol-%, referred to the total number of moles of the (monomeric) starting components; and optionally
c) one or more oxides, which are soluble in the reaction medium and of low volatility, of an element from the main groups Ia to Va or from the subgroups IIb, IIIb, Vb to VIIIb of the periodic table, with the exception of Al, and/or one or more compounds of one of these elements, which compounds are soluble in the reaction medium and under the reaction conditions form an oxide of low volatility, in a quantity of from 0 to 70 mol-%, referred to the total number of moles of the (monomeric) starting components; using a quantity of water smaller than the quantity stoichiometrically required for the complete hydrolysis of the hydrolysable groups, either
  i) further condensation is carried out by adding further water, which wholly or partly brings about the hydrolysis of the remaining hydrolysable groups, and optionally a condensation catalyst, followed by application to the substrate or subjection to a moulding process; and/or
  ii) application to the substrate or subjection to a moulding process is carried out, and then further condensation in an atmosphere containing water vapour.

The following are appropriate for the general formulae given above: alkyl radicals, for example, straight-chain, branched or cyclic radicals having 1 to 20, preferably 1 to 10, carbon atoms and particularly lower alkyl radicals having 1 to 6, preferably 1 to 4 carbon atoms. Particular examples are methyl, ethyl, n-propyl, isopropyl, n-butyl, sec. butyl, tert. butyl, isobutyl, n-pentyl, n-hexyl, dodecyl, octadecyl and cyclohexyl.

Examples of alkenyl radicals and alkinyl radicals are straight-chain, branched or cyclic radicals having 2 to 20, preferably 2 to 10 carbon atoms and at least one C—C double or triple bond and in particular lower alkenyl radicals and alkinyl radicals such as vinyl, allyl, 2-butenyl, ethinyl and propargyl.

The alkoxy, acyloxy, alkylamino, dialkylamino, alkylcarbonyl, alkoxycarbonyl, alkylaryl, arylalkyl, alkenylaryl, arylalkenyl, alkinylaryl, arylalkinyl radicals and the substituted amino radicals or amide radicals can be derived for example, from the above-mentioned alkyl, alkenyl and alkinyl radicals. Particular examples are methoxy, ethoxy, n-propoxy and i-propoxy, n-butoxy, sec. and tert. butoxy, isobutoxy, β-methoxyethoxy, acetyloxy, propionyloxy, monomethylamino, monoethylamino, dimethylamino, diethylamino, N-ethylanilino, methylcarbonyl, ethylcarbonyl, methoxycarbonyl, ethoxycarbonyl, benzyl, 2-phenylethyl, tolyl and styryl. Preferred aryl radicals are phenyl, hydroxyphenyl, biphenyl and naphthyl, with phenyl being particularly preferred.

The said radicals may optionally carry one or more substituents, for example, halogen atoms, lower alkyl or alkoxy radicals and nitro groups. Here halogen atoms (for example, F, Cl, Br) are preferred, particularly fluorine atoms, which can impart to the end product hydrophobic properties and particularly good resistance to condensed water. In this connection halogenated, particularly fluorinated, silanes have proved to be particularly advantageous.

Of the halogens which are bonded directly to the central atom, fluorine, chlorine and bromine are preferred. Chlorine is particularly preferred.

Aluminium compounds which can be used according to the invention are in particular those of the empirical formula $$AlR_3 \quad \quad (II)$$

wherein the radicals R, which can be identical or different, signify halogen, in particular Cl and/or Br, alkyl, alkoxy, acyloxy or hydroxy, while the groups just mentioned can be wholly or partly replaced by chelating ligands. The presence of a chelating ligand is particularly preferred when two or three identical radicals R result in a compound $AlR_3$ which is very reactive towards $H_2O$, and the control of the hydrolysis reaction and the avoidance of precipitates is thereby rendered more difficult. Examples of such radicals R are halogen and alkyl. The use of a chelating ligand is also of advantage when R is OH. Acetylacetone and ethyl acetoacetate, for example, are possible chelating ligands.

Salts of inorganic and organic acids such as, for example, $HNO_3$, $H_2SO_4$, $H_3PO_4$ and formic acid, acetic acid, propionic acid and oxalic acid can also be used according to the invention. In this case complexing by means of a chelating ligand is also recommended.

Specific examples of aluminium compounds which can be used according to the invention are $Al(OCH_3)_3$, $Al(OC_2H_5)_3$, $Al(O—n—C_3H_7)_3$, $Al(O—i—C_3H_7)_3$, $Al(OC_4H_9)$, $Al(O—i—C_4H_9)_3$, $Al(O—sec.—C_4H_9)_3$, $AlCl_3$, $AlCl(OH)_2$, aluminium formate, aluminium acetate and aluminium oxalate as well as the corresponding (partly) chelated compounds such as, for example, the acetylacetonates. Compounds which are liquid at room temperature such as, for example, $Al(O—sec.—C_4H_9)_3$ and $Al(O—i—C_3H_7)_3$, are particularly preferred.

In the organofunctional silanes the group R' can optionally be interrupted by atoms of oxygen or sulphur or by —NR"— groups.

Specific examples of suitable organofunctional silanes are:
$CH_3—Si—Cl_3$, $CH_3—Si—(OC_2H_5)_3$, $C_2H_5—Si—Cl_3$, $C_2H_5—Si—(OC_2H_5)_3$,
$CH_2=CH—Si—(OC_2H_5)_3$, $CH_2=CH—Si—(OC_2H_4OCH_3)_3$,
$CH_2=CH—Si—(OOCCH_3)_3$, $CH_2=CH—SiCl_3$, $CH_2=CH—CH_2—Si—(OCH_3)_3$,
$CH_2=CH—CH_2—Si—(OC_2H_5)_3$, $C_3H_7—Si—(OCH_3)_3$, $C_6H_5—Si—(OCH_3)_3$,
$C_6H_5—Si—(OC_2H_5)_3$, $(CH_3)_2—Si—Cl_2$, $(CH_3)_2—Si—(OC_2H_5)_2$,
$(C_2H_5)_2—Si—(OC_2H_5)_2$, $(CH_3)(CH_2=CH)—Si—Cl_2$,
$(CH_3)_3—Si—Cl$, $(C_2H_5)_3—Si—Cl$, $(CH_3)_2—Si—(OCH_3)_2$,
$(CH_3)_2—Si—(OC_2H_5)_2$, $(C_6H_5)_2—Si—Cl_2$, $(C_6H_5)_2—Si—(OCH_3)_2$,
$(C_6H_5)_2—Si—(OC_2H_5)_2$, $(t—C_4H_9)$, $(CH_3)_2—Si—Cl$,
$(CH_3)_2—(CH_2=CH—CH_2)—Si—Cl$, $(CH_3O)_3—Si—C_3H_6—Cl$, $(C_2H_5O)_3$—Si—$C_3H_6$—CN,

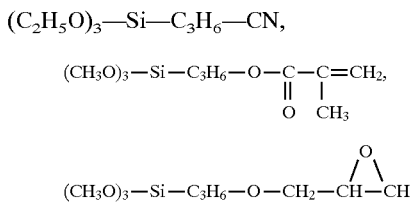

$(CH_3O)_3$—Si—$C_3H_6$—$NH_2$, $(C_2H_5O)_3$—Si—$C_3H_6$—$NH_2$, $(C_2H_5O)_2(CH_3)$—Si—$C_3H_6$—$NH_2$, $H_2N$—$CH_2$—$CH_2$—NH—$C_3H_6$—Si—$(OCH_3)_3$, $H_2N$—$CH_2$—$CH_2$—NH—$CH_2$—$CH_2$—$C_3H_6$—Si—$(OCH_3)_3$,

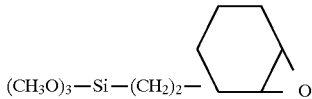

Some of these silanes are commercial products, or they can be prepared by known methods; cf. W. Noll, "Chemie und Technologie der Silicone", Verlag Chemie GmbH, Weinheim/Bergstraβe (1968).

In the silanes of the general formula (I) the index m preferably equals 1. At higher values of m there is the risk that the hardness of the material will decrease if an excessive amount of such a silane is used. Accordingly as a rule the best results are obtained when at least 60 mol-%, particularly at least 75 mol-%, and most preferably at least 90 mol-%, with reference to the total number of moles of silanes of formula (I) used, are silanes wherein m in formula (I) equals 1. The quantity of silanes of formula (I) wherein m equals 3 is preferably not more than 5 mol-% of the silanes used. Particularly preferred silanes for the present invention are γ-glycidyl oxypropyltrialkoxysilanes, γ-aminopropyltrialkoxysilanes, propyltrialkoxysilanes, phenyltrialkoxysilanes, vinyltrialkoxysilanes and mixtures thereof. In these compounds "alkoxy" preferably means methoxy or ethoxy.

Instead of the monomeric starting silanes, precondensed oligomers of these silanes which are soluble in the reaction medium can also optionally be used; that is, straight-chain or cyclic, low-molecular partial condensates (polyorganosiloxanes) having a degree of condensation, for example, of from about 2 to 100, particularly of about 2 to 6. This applies similarly to the aluminium component (b) and the component (c). It is also possible optionally to use an oligomer possessing central atoms differing from one another.

Compounds used as component c) are oxides which are soluble in the reaction medium and of low volatility, or compounds which form such oxides of low volatility, of elements from the main groups Ia to Va or from the subgroups IIb, IIIb, Vb to VIIIb of the periodic table, with the exception of aluminium. The component c) is preferably derived from the following elements: alkaline earth metals, such as Mg and Ca, B, Si, Sn, Pb, P, As, Sb, Bi, Cr, Mo, W, Mn, Fe, Co, Ni, Zn and/or V, with B, Si, Sn, Zn and P being particularly preferred. The lanthanides and actinides may also optionally be used.

Particularly preferred oxides of low volatility are $B_2O_3$, $P_2O_5$ and $SnO_2$.

Examples of compounds which form oxides which are soluble in the reaction medium and of low volatility are inorganic acids, such as phosphoric acid and boric acid, and esters thereof. Also suitable are, for example, halides such as $SiCl_4$, $HSiCl_3$, $SnCl_4$ and $PCl_5$ and alkoxides such as $Ca(OR)_2$, $Si(OR)_4$, $Sn(OR)_4$ and $VO(OR)_3$, wherein R is derived from lower alcohols such as methanol, ethanol, propanol or butanol. Other starting compounds which can be used are corresponding salts of volatile acids, for example, acetates such as silicon tetraacetate, basic acetates such as basic lead acetate and formates.

To prepare the composition according to the invention there are preferably used from 40 to 90, particularly 40 to 80, and particularly preferably 70 to 80 mol-% of component (a), from 10 to 40, particularly 10 to 30, and particularly preferably 15 to 25 mol-% of component (b) and 50 mol-% at most, in particular 40 mol-% at most of component (c).

To prepare the coating, the starting components are precondensed in the desired mixing ratio using a quantity of water smaller than the quantity stoichiometrically required for the complete hydrolysis of all the hydrolysable groups used. This substoichiometric quantity of water is preferably added in such a way that local excess concentrations and precipitates caused thereby (for example, of $Al_2O_3.xH_2O$) are avoided. This can be done, for example, by introducing the quantity of water into the reaction mixture with the assistance of moisture-laden adsorbents, for example, silica gel or molecular sieves, hydrous organic solvents, for example, 800 ethanol, or hydrated salts, for example, $CaCl_2.6H_2O$. Another method is to introduce the water through a system containing components which react with one another and thereby slowly liberate water, as is the case, for example, in the formation of an ester from an alcohol and an acid (ccc, or chemically controlled condensation).

The precondensation is preferably carried out in the presence of a condensation catalyst. Optionally, in particular when one of the components (a) to (c) is highly nonpolar (for example, a silane wherein R' represents aryl), an organic solvent which is at least partly miscible with water can be employed, for example, an aliphatic alcohol such as ethanol, propanol, isopropanol or butanol, an ether such as dimethoxyethane, an ester such as dimethyl glycol acetate, or a ketone such as acetone or methyl ethyl ketone. The preferred solvent is n-butanol. It may be preferable not to evaporate off the solvent added or formed during the precondensation, but to use the reaction mixture as it is for the further condensation.

Suitable condensation catalysts are compounds which abstract protons and hydroxyl ions, and amines. Particular examples are organic or inorganic acids, such as hydrochloric acid, sulphuric acid, phosphoric acid, formic acid or acetic acid, as well as organic or inorganic bases, such as ammonia, alkali metal hydroxides or alkaline earth metal hydroxides, for example, sodium hydroxide, potassium hydroxide or calcium hydroxide, and amines soluble in the reaction medium, for example, lower alkylamines or alkanolamines. In this connection volatile acids and bases, in particular hydrochloric acid, ammonia and triethylamine are particularly preferred. The total concentration of catalyst can be, for example, up to 3 mol/liter.

It is especially advantageous if one of the reaction components (a) to (c) already acts as a condensation catalyst. Here particular mention may be made of the silanes (a) possessing one or more radicals R' which are substituted with basic groups, for example, —$NH_2$. Thus the aminoalkylsilanes, for example, have proved very successful for these purposes. Specific examples of such compounds are γ-aminopropylsilanes, in particular γ-aminopropyl-tri(m)ethoxysilane. The use of such compounds as reaction components has the additional advantage that a decided improvement in the adhesion of the composition to various substrates, for example, plastics, metal, glass, and simultaneously a distinct increase in scratch resistance and abrasion resistance can be observed thereby. Reaction components of this kind which act as condensation catalysts can be used either alone or in combination with the conventional condensation catalysts mentioned above.

The precondensation is usually carried out at temperatures of from −20° to 100° C., preferably of from 0° to 30° C. When an organic solvent is used, the precondensation can also take place at temperatures of up to the boiling point of the solvent, but here also it is preferably carried out at between 0° and 30° C.

Optionally one or more starting components, or part of one, more or all of the starting components, can initially be precondensed and then the remaining starting components admixed and subsequently co-condensed by the process of precondensation or further condensation.

The subsequent hydrolytic further condensation of the precondensate is carried out in the presence of additional water which wholly or partly, for instance, to the extent of at least 80%, particularly of at least 90%, brings about the hydrolysis of the hydrolysable groups still remaining. It is preferable to use an excess of water, referred to the hydrolysable groups still present. In an embodiment preferred on practical grounds, the quantity of water used for the further condensation is that which would be required stoichiometrically for the complete hydrolysis of the starting components employed initially (here the water already added is thus left out of account).

In order as far as possible to avoid precipitation, the water is added particularly preferably in several stages, for example, in three stages. For example, $\frac{1}{10}$ to $\frac{1}{20}$ of the quantity of water stoichiometrically required for hydrolysis is added in the first stage. $\frac{1}{5}$ to $\frac{1}{10}$ of the stoichiometric quantity of water is added after brief stirring and finally, after further brief stirring, a stoichiometric quantity of water is added such that ultimately a slight excess of water is present.

The further condensation is carried out preferably in the presence of one of the above-mentioned condensation catalysts, with volatile compounds and reaction components (a) likewise being preferred. The total concentration of catalyst can be, for example, up to 5 mol/liter.

In the further condensation, optionally one of the above-mentioned organic solvents may also be present or may be added, with solvent formed during the precondensation or further condensation, or solvent which may have been added for the precondensation or further condensation, preferably not being evaporated off after completion of the further condensation.

The precondensate reacts owing to its susceptibility to hydrolysis by water vapour and can therefore also be further condensed in an atmosphere containing water vapour. In this case the addition to the condensate of further water can be wholly or partly dispensed with.

The further condensation is usually carried out at temperatures of from −20° to 100° C., preferably of from 0° to 30° C.

Surprisingly, it has become apparent that on heating the composition obtained to 40° to 80° C. without evaporating off the solvent, its viscosity is stabilised, that is, the viscosity remains essentially constant for a prolonged period after completion of the polycondensation.

The composition can be used as it is after precondensation or after the further condensation. But conventional additives may optionally be added, for example, organic thinners, flow-control agents, colouring agents (dyes or pigments), UV stabilisers, fillers, viscosity controllers, lubricants, wetting agents, antisettling agents or antioxidants.

The processing of the composition must take place within a definite pot life. This pot life depends greatly on the nature and quantity of the components (a) to (c) used and can be, for example, 1 day, or even one week or even longer.

For coating purposes the conventional coating methods are employed, for example, dipping, flow coating, casting, spin-coating, spraying or spreading.

The coating is applied in layer thicknesses of, for example, from 2 to 200 μm, preferably from 2 to 30 μm and particularly from 5 to 15 μm. Optionally the substrate can be primed with an adhesion promoter or priming layer prior to application of the coating according to the invention.

Curing of the coats is carried out according to the invention at temperatures of above 135° C., preferably of above 150° C.

EXAMPLES 3 mm thick plates (12×5 cm) of commercially available polycarbonates (copolycarbonates based on the diphenol Ib and on bisphenol A, Apec HT KU 1-9350 having Tg=185° C., from the firm Bayer or, for comparison, a polycarbonate based on bisphenol A, Makrolon 3108 having Tg=148° C. from the firm Bayer) were purified using isopropanol and were coated with a layer 20 μm thick by being dipped in the scratch-resistant coating according to the invention (Ormocer of ISC Wurzburg of the Fraunhofergesellschaft according to EP 0 358 011 A2) at a dipping rate v=100 cm min$^{-1}$. After being aired for 10 minutes at room temperature, the coated plates were dried at elevated temperatures. The drying times and drying temperature were varied. The layer thickness of the scratch-resistant coat after drying was 5 μm.

The coated plates, after completion of curing, were stored for 2 days at room temperature and then subjected to the Taber abrasion method (ASTM D 1044). The results of the tests are shown in Table 1.

Taber abrasion method (ASTM D 1044)

The testing apparatus consists of a horizontally arranged plate onto which the test piece is fixed. The plate is driven with a rate of rotation of 55±6 revolutions/minute. Two cylindrical abrasive parts (CS-10.F) are arranged vertically and rotatably so that they grind the surface of the test piece, each with a loading of 1000 g.

The turbidity caused by the abrasion is measured in accordance with ASTM 1003, using a sphere photometer. The turbidity is measured on two samples at the time of supply and after rotation. The increase in turbidity (difference between final turbidity sand turbidity at the time of supply) is stated.

Results

Scratch-resistant coatings: Influence of the curing temperature and curing time in the case of BTMC-BPA copolycarbonate plates

| Curing (°C.) | Curing time (min) | Plate material | Taber abrader (Test 4) 1000 g loading Grinding roller CS 10 Turbidity after | |
|---|---|---|---|---|
| | | | >500 cycles | 1000 cycles |
| 135 | 10 | A | 11.4 | 19.0 |
| 150 | 10 | A | 5.5 | 11.5 |
| 170 | 10 | A | 5.3 | 11.3 |
| 150 | 10 | A | 5.5 | 11.5 |
| 150 | 20 | A | 5.3 | 11.5 |
| 150 | 30 | A | 5.2 | 11.4 |
| 150 | 45 | A | 5.2 | 11.4 |

-continued

| Curing (°C.) | Curing time (min) | Plate material | Taber abrader (Test 4) 1000 g loading Grinding roller CS 10 Turbidity after | |
|---|---|---|---|---|
| | | | >500 cycles | 1000 cycles |
| Comparison: | | | | |
| 130 | 10 | C | 14.2 | 33.0 |
| 130 | 45 | C | 10.1 | 17.9 |
| 130 | 45 | A | 9.3 | 15.4 |

BP TMC = 1,1-bis(4-hydroxyphenyl)-3,3,5-trimethylcyclohexane
BPA = 2,2-bis(4-hydroxyphenyl)propane
A = BP-TMC/BPA copolycarbonate Tg = 185° C., Apec HT KU 1–9350 from the firm Bayer
C = BPA polycarbonate Tg = 148° C. Makrolon 3108 from the firm Bayer

What is claimed is:

1. A method for coating polycarbonate moulded parts, the method comprising the steps of:

a) applying a material obtained by hydrolytic polycondensation of an aluminum compound of an organofunctional silane and an oxide compound, in a thickness of from 2 to 200 μm, to a surface of a moulded body comprising a polycarbonate containing diphenol-units in which 2 to 100 mol-% of the diphenol-units correspond to a dihydroxydiphenylcycloalkane of formula (Ia);

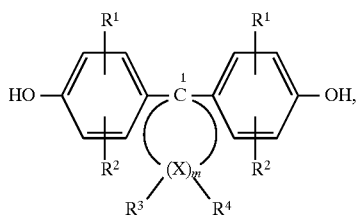

where $R^1$ and $R^2$, independently of one another, represent hydrogen, halogen, $C_1$–$C_8$ alkyl, $C_5$–$C_6$ cycloalkyl, $C_6$–$C_{10}$ aryl, or $C_7$–$C_{12}$ aralkyl, m is 4 or 5, $R^3$ and $R^4$, independently of one another, are individually selectable for each X and represent hydrogen or $C_1$–C6 alkyl, and X represents carbon, with the proviso chat on at least one atom X, $R^3$ and $R^4$ simultaneously represent alkyl, and b) curing the material at a temperature of between 135° and 180° C.

2. The method according to claim 1, wherein the halogen group is chlorine or bromine.

3. The method according to claim 1, wherein the $C_6$–$C_{10}$ aryl group is phenyl.

4. The method according to claim 1, wherein the $C_7$–$C_{12}$ aralkyl group is phenyl- or benzyl- $C_1$–$C_4$ alkyl.

5. The method according to claim 1, wherein the dihydroxydiphenylcycloalkane is a compound of formulae (Ib), (Ic), or (Id):

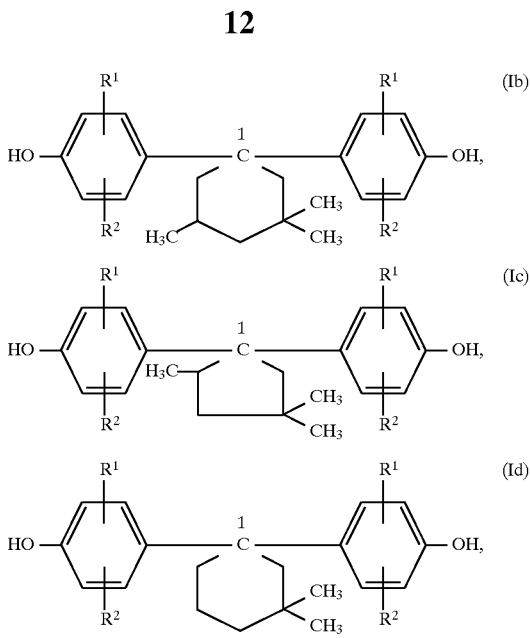

$R^1$ and $R^2$ are the same as defined in formula (Ia).

6. The method according to claim 1, wherein the polycarbonate further contains other diphenol-units in which 0 to 98 mol-% of the other diphenol units correspond to a diphenol of formula (Ie):

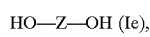

where

Z represents an aromatic radical having 6 to 30 carbon atoms.

7. A polycarbonate moulded body comprising:

a) a thermoplastic, aromatic polycarbonate having a molecular weight $M_w$ of at least 10,000 and containing bifunctional carbonate structural units in which 2 to 100 mol-% of the bifunctional carbonate structural units correspond to a compound of formula (I):

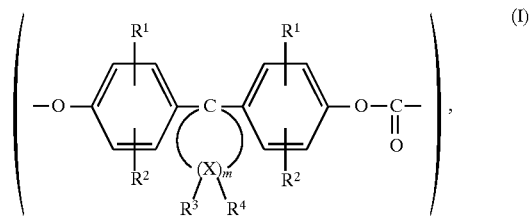

(I), where $R^1$ and $R^2$, independently of one another, represent hydrogen, halogen, $C_1$–$C_8$ alkyl, $C_5$–$C_6$ cycloalkyl, $C_6$–$C_{10}$ aryl, or $C_7$–$C_{12}$ aralkyl, m is 4 or 5, $R^3$ and $R^4$, independently of one another, are individually selectable for each X and represent hydrogen or $C_1$–$C_6$ alkyl, and X represents carbon, with the proviso that on at least one atom X, $R^3$ and $R^4$ simultaneously represent alkyl, and b) a layer having a thickness of from 2 to 200 μm, the layer being obtained by hydrolytic polycondensation of an aluminum compound of an oganofunctional silane and an oxide compound.

8. The polycarbonate moulded body according to claim 7, wherein the halogen group is chlorine or bormine.

9. The polycarbonate moulded body according to claim 7, wherein the $C_6$–$C_{10}$ aryl group is phenyl.

10. The polycarbonate moulded body according to claim 7, wherein the $C_7$–$C_{12}$ aralkyl group is phenyl- or benzyl-$C_1$–$C_4$ alkyl.

11. The polycarbonate moulded body according to claim 7, wherein the molecular weight $M_w$ of the polycarbonate is between 20,000 and 300,000.

12. The polycarbonate moulded body according to claim 7, wherein the polycarbonate corresponds to a compound of formula (Ig):

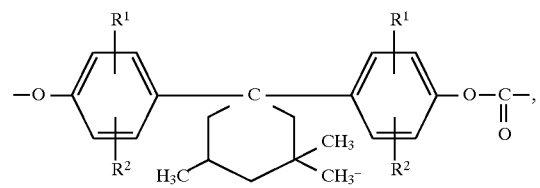

where $R^1$ and $R^2$ are the same as defined in formula (I).

* * * * *

UNITED STATES PATENT AND TRADEMARK OFFICE
CERTIFICATE OF CORRECTION

PATENT NO. : 5,849,414
DATED : December 15, 1998
INVENTOR(S) : Peter Bier et al.

It is certified that error appears in the above-identified patent and that said Letters Patent is hereby corrected as shown below:

Claim 1, line 18 (column 11, line 50/51), delete "$C_1$-C6" and insert in its place -- $C_1$-$C_6$ --.

Claim 1, line 21 (column 11, line 53/54), delete "chat" and insert in its place -- that --.

Signed and Sealed this

Third Day of August, 1999

Attest:

Q. TODD DICKINSON

Attesting Officer

Acting Commissioner of Patents and Trademarks